(12) United States Patent
Bavand et al.

(10) Patent No.: US 10,075,935 B1
(45) Date of Patent: Sep. 11, 2018

(54) METHOD AND SYSTEM FOR POSITIONING STATE TRANSITION

(71) Applicant: MAPSTED CORP., Markham OT (CA)

(72) Inventors: Majid Bavand, Toronto (CA); Sean Huberman, Guelph (CA); Eros Gulo, Woodbridge (CA)

(73) Assignee: MAPSTED CORP., Markham, Ontario (CA)

( * ) Notice: Subject to any disclaimer, the term of this patent is extended or adjusted under 35 U.S.C. 154(b) by 0 days.

(21) Appl. No.: 15/803,082

(22) Filed: Nov. 3, 2017

(51) Int. Cl.
| H04W 64/00 | (2009.01) |
| G01S 5/02 | (2010.01) |
| H04W 24/08 | (2009.01) |
| G01C 21/20 | (2006.01) |
| G01C 21/04 | (2006.01) |

(52) U.S. Cl.
CPC .......... H04W 64/006 (2013.01); G01C 21/04 (2013.01); G01C 21/206 (2013.01); G01S 5/0252 (2013.01); H04W 24/08 (2013.01)

(58) Field of Classification Search
CPC ...... G01S 5/0252; G01S 5/0263; G01S 19/48; G01C 21/005; G01C 21/206; H04W 64/00; H04W 64/006
See application file for complete search history.

(56) References Cited

U.S. PATENT DOCUMENTS

| 6,166,685 A | 12/2000 | Soliman | |
| 6,323,807 B1 * | 11/2001 | Golding | G01C 21/20 342/419 |
| 7,327,245 B2 * | 2/2008 | Krumm | G01W 1/17 340/501 |

(Continued)

FOREIGN PATENT DOCUMENTS

WO   WO-2006067339 A1 *   6/2006   ............ H04W 64/00

OTHER PUBLICATIONS

Li, Mo et al., "IODetector: A generic service for indoor/outdoor detection", ACM Trans. Sensor Netw. 11, 2, Article 28 (Dec. 2014), 29 pages. DOI: http://dx.doi.org/10.1145/2659466 (Year: 2014).*

(Continued)

*Primary Examiner* — Behrang Badii
*Assistant Examiner* — David A Testardi
(74) *Attorney, Agent, or Firm* — Henry L. Ohab (57) ABSTRACT

A method and system for detecting a transition in positioning state of a mobile device relative to an indoor facility. The method, executed in a processor of the mobile device, comprises monitoring, based at least in part on global positioning system (GPS) data, for a positioning state of the mobile device as one of an indoor and an outside location relative to an indoor facility, determining a set of probabilistic weightings for respective ones of ambient data and the GPS data, the ambient data including one or more of received signal strength data, signal connectivity data, magnetic data, ambient lighting data and barometric data, and (Continued)

detecting a transition in positioning state of the mobile device from one of the indoor and the outside locations to another of the indoor and the outside locations when a weighted sum value based at least in part on the set of probabilistic weightings is one of above and below a predetermined state transition value.

18 Claims, 3 Drawing Sheets

(56) References Cited

U.S. PATENT DOCUMENTS

| | | | |
|---|---|---|---|
| 7,397,357 B2* | 7/2008 | Krumm | G01W 1/17 |
| | | | 340/501 |
| 8,532,676 B1* | 9/2013 | El-Sallabi | H04W 64/00 |
| | | | 455/404.2 |
| 9,125,019 B1* | 9/2015 | Heikkila | H04W 4/023 |
| 9,161,175 B1* | 10/2015 | Smith | G01S 19/48 |
| 9,332,389 B1* | 5/2016 | De Lorenzo | H04W 4/023 |
| 9,766,080 B1* | 9/2017 | Ortiz | G01C 21/206 |
| 2003/0182053 A1 | 9/2003 | Swope | |
| 2007/0239813 A1* | 10/2007 | Pinder | G01S 19/48 |
| | | | 708/270 |
| 2009/0189810 A1 | 7/2009 | Murray | |
| 2010/0317366 A1* | 12/2010 | Shen | G01S 5/0252 |
| | | | 455/456.1 |
| 2012/0264446 A1* | 10/2012 | Xie | G01C 22/00 |
| | | | 455/456.1 |
| 2013/0065604 A1 | 3/2013 | Werner et al. | |
| 2013/0124081 A1* | 5/2013 | Khosravy | G01S 5/0263 |
| | | | 701/408 |
| 2014/0002307 A1* | 1/2014 | Mole | G01S 5/0263 |
| | | | 342/451 |
| 2014/0171068 A1* | 6/2014 | Marti | G01S 1/047 |
| | | | 455/427 |
| 2014/0171114 A1* | 6/2014 | Marti | G01C 21/10 |
| | | | 455/456.2 |
| 2014/0171118 A1* | 6/2014 | Marti | G01S 5/0252 |
| | | | 455/456.3 |
| 2014/0171126 A1* | 6/2014 | Mayor | G01S 5/14 |
| | | | 455/456.6 |
| 2014/0179298 A1* | 6/2014 | Grokop | G01S 19/48 |
| | | | 455/418 |
| 2014/0187258 A1* | 7/2014 | Khorashadi | G01C 21/206 |
| | | | 455/456.1 |
| 2015/0341753 A1* | 11/2015 | Chen | H04W 4/04 |
| | | | 455/456.1 |
| 2016/0014554 A1* | 1/2016 | Sen | H04W 4/02 |
| | | | 455/456.2 |
| 2016/0080911 A1* | 3/2016 | Kay | H04W 4/04 |
| | | | 455/456.1 |
| 2017/0078854 A1* | 3/2017 | Swaminathan | H04W 4/043 |
| 2017/0336936 A1* | 11/2017 | Mohammad Mirzaei | |
| | | | G01C 21/206 |

OTHER PUBLICATIONS

Zhou, Pengfei et al., "IODetector: A Generic Service for Indoor Outdoor Detection", SenSys'12, Nov. 6-9, 2012, Toronto, On, Canada, (c) 2012 ACM, 14 pages (Year: 2012).*

Hossain, A.K.M. Mahtab et al., "Utilization of user feedback in indoor positioning system", Pervasive and Mobile Computing, vol. 6 (2010), pp. 467-481 (Year: 2010).*

* cited by examiner

METHOD AND SYSTEM FOR POSITIONING STATE TRANSITION

BACKGROUND OF THE INVENTION

Users of mobile devices are increasingly using and depending upon indoor positioning and navigation applications and features. Seamless, accurate and dependable indoor positioning can be difficult to achieve using satellite-based navigation systems when the latter becomes unavailable, or sporadically available, and therefore unreliable, such as within enclosed or partially enclosed urban infrastructure and buildings, including hospitals, shopping malls, airports, universities and industrial warehouses. An institution, such as a hospital, airport, university or shopping complex may typically consist of separate buildings or indoor facilities interconnected via pedestrian paths within a campus, traversal of which might involve transitioning repeatedly from indoor to outdoor and vice versa.

DETAILED DESCRIPTION OF THE INVENTION

Embodiments herein provide for automatic detection of a transition in positioning or location state of a mobile device relative to an indoor facility or building, such as a transition from an indoor to an outside location and vice versa, based on determining, and deploying, a state transition parameter.

Among other benefits and technical effects, it is recognized that an initial indication from global positioning system (GPS) data as to whether a mobile device is located either indoor or outside but nearby a building or indoor facility, may not in fact be dispositive, or sufficiently dispositive, as to a true location state of the mobile device, at least partly because GPS data may be limited in accuracy, or otherwise unreliable in regard to non-line of sight (NLOS) contexts such as an indoor facility. In one embodiment, the mobile device may initiate determining a set of probabilistic weightings for one or more of signal strength data, signal connectivity data, magnetic data, and barometric data and the GPS data. In embodiments, a transition in positioning state of the mobile device from one of the indoor and the outside locations to another of the indoor and the outside locations may be detected depending on whether a weighted sum value based at least in part on the set of probabilistic weightings transitions to either above or below a predetermined state transition value. The term GPS as used herein encompasses alternative satellite-based navigation schemes.

Also provided is a mobile device including a processor and a memory storing a set of computer instructions. The instructions are executable in the processor to monitor, based at least in part on global positioning system (GPS) data, for a positioning state of the mobile device as one of an indoor and an outside location relative to an indoor facility, and to determine a set of probabilistic weightings for respective ones of ambient data and the GPS data, the ambient data including one or more of signal strength data, signal connectivity data, magnetic data, and barometric data. A transition in positioning state of the mobile device from one of the indoor and the outside locations to another of the indoor and the outside locations may be detected when a weighted sum value based at least in part on the set of probabilistic weightings is one of above and below a predetermined state transition value.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

A mobile device as described herein may be implemented, in whole or in part, on mobile computing devices such as cellular or smartphones, laptop computers, wearable computer devices, and tablet devices. Memory, processing, and network resources may all be used in connection with the use and performance of embodiments described herein, including with the performance of any method or with the implementation of any system.

Furthermore, one or more embodiments described herein may be implemented through the use of instructions that are executable by one or more processors. These instructions may be carried on a computer-readable medium. In particular, machines shown with embodiments herein include processor(s) and various forms of memory for holding data and instructions. Examples of computer-readable mediums and computer storage mediums include portable memory storage units, and flash memory (such as carried on smartphones). A mobile device as described herein utilizes processors, memory, and instructions stored on computer-readable medium. Embodiments described herein may be implemented in the form of computer programs stored on computer memory mediums.

System Description

Figure 1:
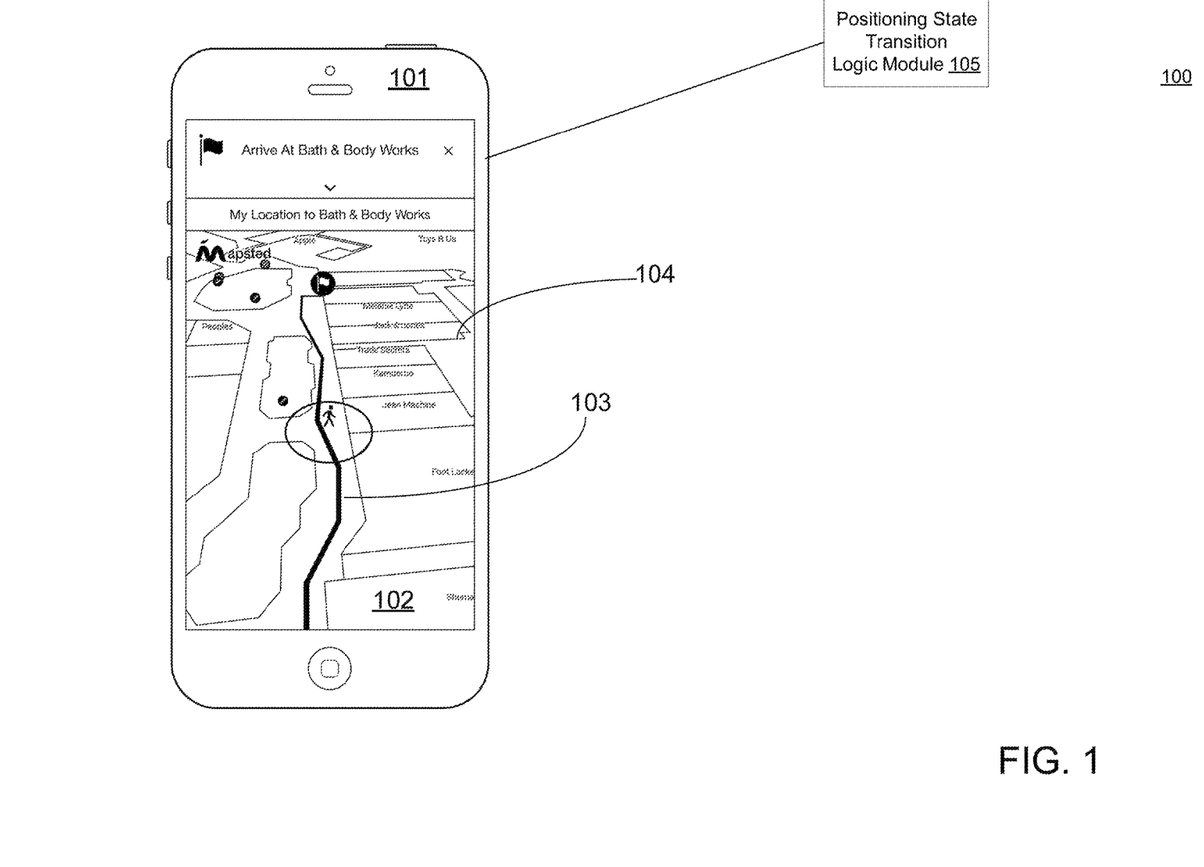
FIG. 1 illustrates, in an example embodiment, a position state transition detection system including a mobile device.

FIG. 1 illustrates, in an example embodiment, position state transition detection system 100 including mobile device 101. Mobile device 101 may be such as a cellular or smartphone, a laptop or a tablet computer, or a wearable computer device that is operational for telephony, messaging, and data computing. Mobile device 101 may be connected within a computer network system, including the internet or other wide area network, to one or more remote server computing devices. Mobile device 101 may include positioning state transition logic module 105, the latter embodied according to computer processor-executable instructions stored within a memory of, or otherwise accessible to a processor of, mobile device 101. In alternate embodiments, it is contemplated that one or more portions of positioning state transition logic module 105 may be stored at the remote server computing devices while being communicatively accessible to mobile device 101 via the computer network system.

A navigation, or positioning, software application downloaded and installed, or stored, in a memory of mobile device 101 may render physical layout map 102 related to an indoor facility or building within a user interface display of mobile device 101. In one embodiment, the navigation software application may incorporate positioning state transition logic module 105. The terms indoor facility or building as used herein means an at least partially enclosed building having at least one fixed boundary, such as an exterior boundary wall. Display of physical layout map 102 may further show trajectory or route 103 traversed by the mobile device, which may further include an estimated trajectory segment predicted or recommended for traversal by mobile device 101. Physical layout map 102 may further depict one or more map constraint features 104, such as an internal wall or other map constraint feature including a doorway, a facility exit, a physical marker fixed in place, a facility entrance, a stairwell, a stairway, a corridor, an elevator, and an external boundary outline of the indoor facility.

Figure 2:
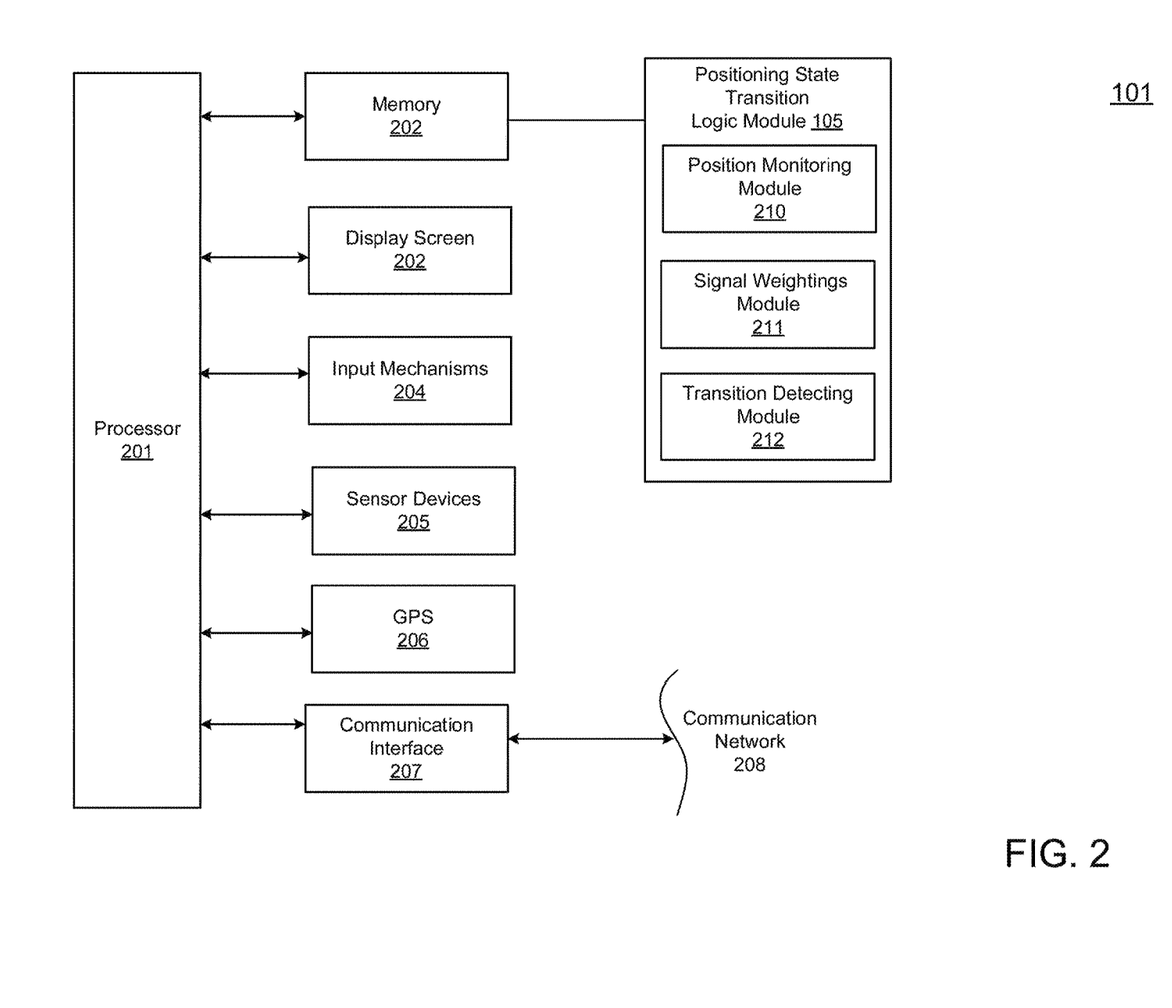
FIG. 2 illustrates an architecture of a mobile device having a position state transition detection capability, in one embodiment.

FIG. 2 illustrates an architecture of mobile device 101 having a position state transition detection capability, in one embodiment. Mobile device 101 may include processor 201, memory 202, display screen 203, input mechanisms 204 such as a keyboard or software-implemented touchscreen input functionality, barcode, QR code or other symbol- or code-scanner input functionality. Mobile device 102 may include sensor functionality by way of sensor devices 205. Sensor devices 205 may include inertial sensors such as an accelerometer and a gyroscope, and magnetometer or other magnetic field sensing functionality, barometric or other ambient pressure sensing functionality, and ambient lighting sensors, such as to detect ambient lighting intensity. Mobile device 102 may also include capability for detecting and communicatively accessing ambient wireless communication signals including but not limited to any of Bluetooth and Bluetooth Low Energy (BLE), Wi-Fi, RFID, and also global positioning system (GPS) signals. Mobile device 102 further includes the capability for detecting, via sensor devices 205, and measuring a received signal strength, and of determining signal connectivity parameters, related to the ambient wireless signals. In particular, mobile device 102 may include location determination capability such as by way of GPS module 206 having a GPS receiver, and communication interface 207 for communicatively coupling to communication network 208, such as by sending and receiving cellular data over data and voice channels.

Positioning state transition logic module 105 includes instructions stored in memory 202 of mobile device 101. In embodiments, positioning state transition logic module 105 may be included in a mobile device navigation application program stored in memory 202 of mobile device 102. The term indoor location as used herein refers to a location within the facility or building, such as within a shopping mall, an airport, a warehouse, a university campus, or any at least partially enclosed building. Positioning state transition logic module 105 may comprise sub-modules including position monitoring module 210, signal weightings module 211 and transition detecting module 212.

Processor 201 uses executable instructions stored in position monitoring module 210 to monitor, based at least in part on GPS 206 module data, for a positioning state of mobile device 101 as one of an indoor and an outside location relative to an indoor facility. The term positioning state as used herein refers to a position or location state of a mobile device, such as carried by a mobile device user, relative to an indoor facility or building. Thus, the positioning state may be described using location classifications such an indoor state within the facility, an outside state which means outside of, but near, the facility, and a faraway state which means outside and far away from the facility. In embodiments, upon detecting, based on the monitoring, the positioning state of mobile device 101 as an outside location, processor 201 in conjunction with position monitoring module 210 initiates receiving at least one of magnetic data, inertial sensor data, signal strength data, signal connectivity data, ambient lighting data and barometric data, from sensors 205 in one embodiment, at mobile device 101. The inertial sensor data maybe acquired from at least one of an accelerometer and a gyroscope of 101 mobile device, in an embodiment.

In an embodiment, if determined, based on the GPS data, that the positioning state is a faraway state of the mobile device relative to the indoor facility, using processor 201, at least some sensors, and their associated data computations in processor 201, such as barometric, ambient lighting, magnetic, and wireless signal sensors upon which the signal strength and signal connectivity data are based may be selectively switched off or selectively switched to a low power sleep mode to reduce mobile device 101 electrical power consumption.

Processor 201 uses executable instructions stored in signal weightings module 211 to determine a set of probabilistic weightings for respective ones of a set of ambient data and the GPS data, the set of ambient data including one or more of received signal strength data, signal connectivity data, magnetic field data, ambient lighting data and barometric data.

Processor 201 uses executable instructions stored in transition detecting module 212 to detect a transition in positioning state of mobile device 101 from one of the indoor and the outside locations to another of the indoor and the outside locations when a weighted sum value based at least in part on the set of probabilistic weightings is one of above and below a predetermined state transition value. In one embodiment, upon detecting that the transition in positioning state is from the outside to the indoor location, the instructions embodied in transition detecting module 212 provide for initiating display of a facility layout map of the indoor location showing at least one of a mobile device 101 position and an estimated trajectory segment within the indoor location based on computations by the processor. The computations may be based on the at least one of inertial sensor data, the received signal strength and signal connectivity data, the magnetic data, the barometric data and a historical set of trajectory data associated with the indoor location. The display of the facility layout map may include a map constraint feature including one or more of a doorway, an exit, a physical marker, an entrance, a wall, a stairwell, a stairway, a corridor, an elevator, and a boundary outline of the indoor facility.

In one embodiment, upon detecting that the transition in positioning state is from the indoor to the outside location, the instructions embodied in transition detecting module 212 are executable to terminate the display of the facility layout map, or displaying the map according to at least one of a reduced brightness level and a reduced intensity level, thus reducing electrical power consumed by the processor.

In another embodiment, upon detecting that the transition in positioning state is from the indoor to the outside location, the instructions embodied in transition detecting module 212 are further executable to terminate the computations in processor 201 related to any of the inertial sensor data, the received signal strength and connectivity data, the magnetic data, the ambient lighting data, the barometric data and the historical set of trajectory data associated with the indoor location, again resulting in reduced electrical power consumed by processor 201.

Methodology

Figure 3:
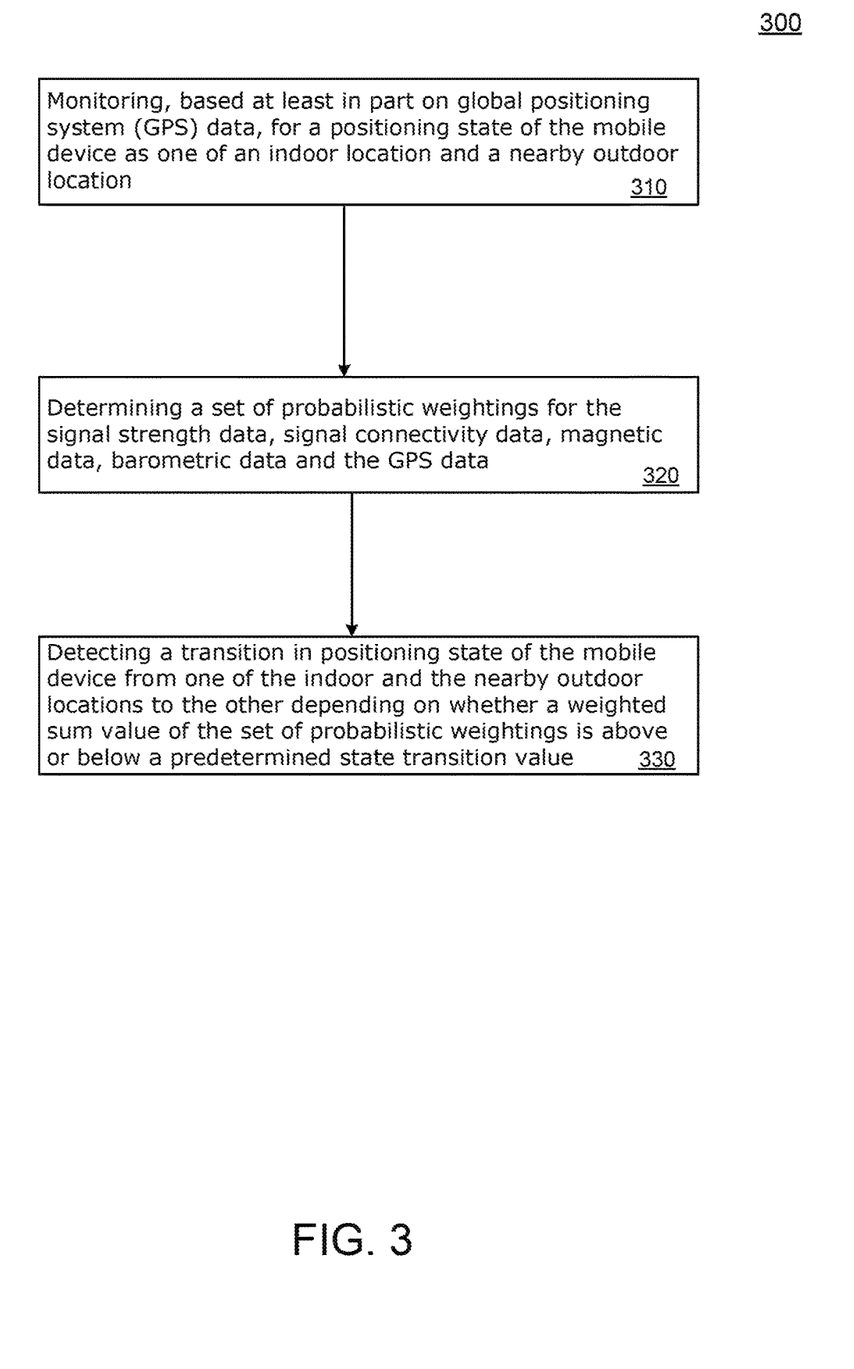
FIG. 3 illustrates, in an example embodiment, a method of operation of a position state transition detection system.

FIG. 3 illustrates, in an example embodiment, a method of operation of position state transition detection system 100. In describing examples of FIG. 3, reference is made to the examples of FIGS. 1-2 for purposes of illustrating suitable components or elements for performing a step or sub-step being described.

Examples of method steps described herein relate to the use of mobile device 101 for implementing the techniques described. According to one embodiment, the techniques are performed by positioning state transition logic module 105 of mobile device 101 in response to the processor 201 executing one or more sequences of software logic instructions that constitute positioning state transition logic module 105. In embodiments, positioning state transition logic module 105 may include the one or more sequences of instructions within sub-modules including position monitoring module 210, signal weightings module 211 and transition detecting module 212. Such instructions may be read into memory 202 from machine-readable medium, such as memory storage devices. Execution of the sequences of instructions contained in position monitoring module 210, signal weightings module 211 and transition detecting module 212 of positioning state transition logic module 105 in memory 202 causes processor 201 to perform the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions. Additionally, it is contemplated that in alternative embodiments, the techniques, or portions thereof, may be distributed between the mobile device 101 and a remote server computing device. For example, the mobile device may collect and transmit data to the server that, in turn, performs at least some portion of the techniques described herein.

At step 310, monitoring, based at least in part on global positioning system (GPS) data, for a positioning state of mobile device 101 as one of an indoor and an outside location relative to an indoor facility.

In embodiments, upon detecting, based on the monitoring, the positioning state of mobile device 101 as an outside location, processor 201 in conjunction with position monitoring module 210 initiates receiving at least one of magnetic data, inertial sensor data, signal strength data, signal connectivity data, ambient lighting data and barometric data, from sensors 205 in one embodiment, at mobile device 101. The inertial sensor data maybe acquired from at least one of an accelerometer and a gyroscope of 101 mobile device, in an embodiment.

In an embodiment, if determined, based on the GPS data, that the positioning state is a faraway state of the mobile device relative to the indoor facility, using processor 201, at least some sensors, and their associated data computations in processor 201, such as barometric, ambient lighting, magnetic, and wireless signal sensors upon which the signal strength and signal connectivity data are based may be switched off or switched to a low power sleep mode to reduce mobile device 101 electrical power consumption.

At step 320, determining a set of probabilistic weightings for respective ones of ambient data and the GPS data. The ambient data may include one or more of signal strength data, signal connectivity data, magnetic data, ambient lighting data and barometric data. In one embodiment, the set of probabilistic weighting values for respective ones of the signal strength data, the signal connectivity data, the magnetic data and the barometric data are determined based at least partly on a pre-existing calibrated fingerprint map of the indoor location. Probabilistic weightings may be assigned at time of building calibration depending on building particulars. For example, existence of skylight(s) over a building floor may result in a higher GPS probabilistic weighting due to a higher confidence level in the accuracy of attendant GPS signals.

The terms fingerprint and fingerprint data as used herein refer to time-correlated, individual measurements of any combination of received wireless communication signal strength and signal connectivity parameters, magnetic field parameters (strength, direction) or barometric pressure parameters, and mobile device inertial sensor data at known, particular locations relative to an indoor facility or building. In other words, a fingerprint may include sensor and signal characteristics (including but not necessarily limited to wireless signal strength, magnetic, barometric, ambient lighting, and inertial sensor information) correlated with respective unique locations at respective given instances in time during a positioning calibration process in or near a building. The unique location may be along a sequence of positions or locations that constitute a navigation path traversed by the mobile device relative to the indoor facility or building while recording time- and position-correlated sensor and signal characteristics or signatures, for instance. The fingerprint data may be acquired by way of ambient signal parameter measurements and mobile device inertial sensor measurements during a calibration process performed to map the fingerprint data in relation to a given indoor facility physical layout. In some embodiments, given that sampling times and sampling rates applied in conjunction with particular mobile device sensors may be different, the signal and sensor information as measured during a fingerprint calibration process may be time-averaged across particular periods of time, with the time-averaged value being used to represent the signal information at any given instance of time within that particular period of time in which the signal information is being time-averaged. Fingerprint data may be applied to create mobile device route traversal data within, and even adjoining, the indoor facility.

In the case of the GPS data, the probabilistic weighting value for the GPS data may be based at least in part on any one, or a combination, of a distance from a GPS determined location associated with the positioning state to a boundary of the indoor facility, such as an external boundary wall, and a predetermined degree of accuracy associated with the GPS signal. The degree of accuracy or credibility associated with the GPS signal may be assigned based on whether a skylight or other opening exists directly overhead within the indoor facility, or any other factors that might justify an expectation that the GPS signal is likely accurate and trustworthy while indoor.

Calculation of Wi-Fi connectivity probabilistic weighting value depends on the building's list of Wi-Fi access points relative to Wi-Fi fingerprint data established for a given location in, or nearby, the indoor facility. In this approach, as each access point in or near a particular building is localized, a confidence level may be assigned in regard to the localization accuracy, in accordance with the degree of Wi-Fi signal coverage, with more comprehensive signal coverage resulting in a higher Wi-Fi probabilistic weighting.

Calculation of probabilistic weighting value for the Wi-Fi scanned signal strength also depends on the building's list of Wi-Fi access points relative to Wi-Fi fingerprint data established for the given location, associated with a confidence level for each Wi-Fi access point. In each received signal strength (RSS) scan, if the scanned access point exists in the fingerprint map of the building access points, and the confidence level of localized access point is higher than a predetermined amount, the RSS value is passed to a function, for example a piecewise linear function, to be converted to a weight. The effect of each scanned Wi-Fi RSS may be accumulative to calculate a final probabilistic weighting value for the scanned Wi-Fi signals.

Calculation of the probabilistic weighting for scanned Bluetooth Low Energy (BLE) beacons may be performed similarly as for the calculation of the scanned RSS Wi-Fi probabilistic weighting value. The BLE beacon may pass one or a list of estimated positions with their confidence levels to signal weightings module 211. In general, via mobile device 101 signal strength sensors 205, more Wi-Fi and Bluetooth access points and BLE beacons are observed, and with stronger received signals when the mobile device 101 user is indoor compared to the outside.

Barometric pressure data and magnetic field data may be observed and probabilistic weightings calculated in relation to barometric and magnetic parameters in accordance with the fingerprint map of the facility.

Ambient lighting level data associated with the indoor and outside states as observed by ambient lighting sensor of sensors 205 of mobile device 101 may be correlated with a time of day to calculate a probabilistic weighting value.

A weighted sum value may then be calculated from the probabilistic weighting values, and applied in establishing a state transition value, above which the position state is represented as indoor, and below which the position state is represented as outside of the facility.

At step 330, detecting a transition in positioning state of mobile device 101 from one of the indoor and the outside locations to another of the indoor and the outside locations when a weighted sum value based at least in part on the set of probabilistic weightings is one of above and below a predetermined state transition value. In one embodiment, the state transition value may be predetermined, or set, at least in part empirically based on a calibration process involving known or pre-identified indoor/outside transition points and the determined probabilistic weightings based on measured values of the GPS data, ambient signal data, magnetometer data, barometric data, and inertial sensor data at the pre-identified transition points, or in the vicinity of those transition points. The state transition value may be a probabilistic value predetermined or set as greater than zero but less than one, in an embodiment. The term ambient signal data, also referred to herein as ambient data, as used herein includes received signal strength data and signal connectivity data related to wireless communication protocols, including but not limited to Wi-Fi and Bluetooth signals.

In another embodiment, upon detecting that the transition in positioning state is from the outside to the indoor location, initiate display of a facility layout map of the indoor location showing at least one of a mobile device position and an estimated trajectory segment within the indoor location based on computations by the processor. The computations may be based on the inertial sensor data, the received signal strength and signal connectivity data, the magnetic data, the barometric data, ambient lighting data and a historical set of trajectory data associated with the indoor location. The display of the facility layout map includes a map constraint feature including at least one of a doorway, an exit, a physical marker, an entrance, a wall, a stairwell, a stairway, a corridor, an elevator, and a boundary outline of the indoor facility.

In one embodiment, upon detecting that the transition in positioning state is from the indoor to the outside location, terminating the display of the facility layout map, or displaying the map according to at least one of a reduced brightness level and a reduced intensity level, wherein electrical power consumed by the processor is reduced.

In another embodiment, upon detecting that the transition in positioning state is from the indoor to the outside location, terminating the computations in processor 201 based on one or more of inertial sensor data, the received signal strength and connectivity data, the magnetic data, the ambient lighting data, the barometric data and the historical set of trajectory data associated with the indoor location, again resulting in reduced electrical power consumed by processor 201.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. A method for detecting a transition in positioning state of a mobile device having a processor and a memory, the method comprising:
   monitoring, based at least in part on global positioning system (GPS) data of the mobile device, for a positioning state of the mobile device as one of an indoor and an outside location relative to an indoor facility;
   detecting, via one or more sensors of the mobile device, ambient data;
   determining respective weightings for the ambient data and the GPS data, the ambient data including one or more of received signal strength data and signal connectivity data, wherein the respective weightings for at least one of the signal strength data and the signal connectivity data are assigned, by the processor, based on a degree of signal coverage established according to fingerprint data of a fingerprint map for the indoor facility; and
   detecting, by the processor, a transition in positioning state of the mobile device from one of the indoor and the outside locations to another of the indoor and the outside locations when a weighted sum value based at least in part on the respective weightings is one of above and below a predetermined state transition value.

2. The method of claim 1 wherein the weighting for the GPS data is based at least in part on at least one of a distance from a GPS determined location associated with the positioning state to a boundary of the indoor facility and a predetermined degree of accuracy associated with the GPS signal.

3. The method of claim 1 wherein, upon detecting, based on the monitoring, the positioning state of the mobile device as the outside location, receiving at least one of magnetic data, inertial sensor data, signal strength data, signal connectivity data and barometric data from a set of mobile device sensors.

4. The method of claim 3 wherein the set of mobile device sensors includes at least one of an accelerometer and a gyroscope, and the inertial sensor data is acquired using the at least one of the accelerometer and the gyroscope.

5. The method of claim 3 wherein, upon detecting that the transition in positioning state is from the outside to the indoor location, initiate display, at the mobile device, of a facility layout map of the indoor location showing at least one of a mobile device position and an estimated trajectory segment within the indoor location based on computations by the processor, the computations based on the at least one of inertial sensor data, the received signal strength and signal connectivity data, the magnetic data, the barometric data and a historical set of trajectory data associated with the indoor location.

6. The method of claim 5 wherein the display of the facility layout map includes a physical constraint feature including at least one of a doorway, an exit, a physical marker, an entrance, a wall, a stairwell, a stairway, a corridor, an elevator, and a boundary outline of the indoor facility.

7. The method of claim 5 further comprising:
detecting that the transition in positioning state is from the indoor to the outside location; and
at least one of terminating the display of the facility layout map and displaying the map according to at least one of a reduced brightness level and a reduced intensity level, wherein electrical power consumed by the processor is reduced.

8. The method of claim 5 further comprising:
detecting that the transition in positioning state is from the indoor to the outside location; and
terminating the computations in the processor based on the at least one of inertial sensor data, the received signal strength and connectivity data, the magnetic data, the barometric data and the historical set of trajectory data associated with the indoor location.

9. The method of claim 1 further comprising:
determining, based on the GPS data, that the positioning state is the outside location relative to the indoor facility; and
selectively switching off, using the processor, a plurality of mobile device sensors upon which any of the signal strength data, the signal connectivity data, ambient lighting data and barometric data are based.

10. A mobile device comprising:
a processor;
a memory storing a set of instructions, the instructions executable in the processor to:
monitor, based at least in part on global positioning system (GPS) data of the mobile device, for a positioning state of the mobile device as one of an indoor and an outside location relative to an indoor facility;
detect, via one or more sensors of the mobile device, ambient data;
determine respective weightings for the ambient data and the GPS data, the ambient data including one or more of received signal strength data and signal connectivity data, wherein the respective weightings for at least one of the signal strength data and the signal connectivity data are assigned based on a degree of signal coverage established according to fingerprint data of a fingerprint map for the indoor facility; and
detect a transition in positioning state of the mobile device from one of the indoor and the outside locations to another of the indoor and the outside locations when a weighted sum value based at least in part on the respective weightings is one of above and below a predetermined state transition value.

11. The mobile device of claim 10 wherein the weighting for the GPS data is based at least in part on at least one of a distance from a GPS determined location associated with the positioning state to a boundary of the indoor facility and a predetermined degree of accuracy associated with the GPS signal.

12. The mobile device of claim 11 further comprising instructions executable in the processor to:
upon detecting, based on the monitoring, the positioning state of the mobile device as the inside location, receiving at least one of magnetic data, inertial sensor data, signal strength data, signal connectivity data and barometric data from a set of mobile device sensors.

13. The mobile device of claim 12 wherein the set of mobile device sensors include at least one of an accelerometer and a gyroscope, and the inertial sensor data is received using the at least on of the accelerometer and the gyroscope.

14. The mobile device of claim 13 further comprising instructions executable in the processor to:
upon detecting that the transition in positioning state is from the outside to the indoor location, initiate display, at the mobile device, of a facility layout map of the indoor location showing at least one of a mobile device position and an estimated trajectory segment within the indoor location based on computations by the processor, the computations based on the at least one of inertial sensor data, the received signal strength and signal connectivity data, the magnetic data, the barometric data and a historical set of trajectory data associated with the indoor location.

15. The mobile device of claim 14 wherein the display of the facility layout map includes a physical constraint feature including at least one of a doorway, an exit, a physical marker, an entrance, a wall, a stairwell, a stairway, a corridor, an elevator, and a boundary outline of the indoor facility.

16. The mobile device of claim 15 further comprising instructions executable in the processor to:
detect that the transition in positioning state is from the indoor to the outside location; and
at least one of terminate the display of the facility layout map and display the map according to at least one of a reduced brightness level and a reduced intensity level, wherein electrical power consumed by the processor is reduced.

17. The mobile device of claim 16 further comprising instructions executable in the processor to:
detect that the transition in positioning state is from the indoor to the outside location; and
terminate the computations in the processor based on the at least one of inertial sensor data, the received signal strength and connectivity data, the magnetic data, the barometric data and the historical set of trajectory data associated with the indoor location.

18. The mobile device of claim 10 further comprising instructions executable in the processor to:
  determine, based on the GPS data, that the positioning state is the outside location relative to the indoor facility; and
  selectively switch off, using the processor, a plurality of mobile device sensors upon which any of the signal strength data, the signal connectivity data, ambient lighting data and barometric data are based.

\* \* \* \* \*